(12) United States Patent
Matsui et al.

(10) Patent No.: US 10,108,024 B2
(45) Date of Patent: Oct. 23, 2018

(54) LENS BARREL

(71) Applicant: Panasonic Intellectual Property Management Co., Ltd., Osaka (JP)

(72) Inventors: Kazuaki Matsui, Hyogo (JP); Manabu Kobayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 160 days.

(21) Appl. No.: 15/082,075

(22) Filed: Mar. 28, 2016

(65) Prior Publication Data
US 2016/0291282 A1    Oct. 6, 2016

(30) Foreign Application Priority Data

Mar. 30, 2015  (JP) .................................. 2015-070148
Jan. 29, 2016  (JP) .................................. 2016-015010

(51) Int. Cl.
| G02B 7/00 | (2006.01) |
| G02B 7/02 | (2006.01) |
| G02B 27/64 | (2006.01) |
| G02B 7/14 | (2006.01) |

(52) U.S. Cl.
CPC .......... G02B 27/646 (2013.01); G02B 7/006 (2013.01); G02B 7/022 (2013.01); G02B 7/026 (2013.01); G02B 7/14 (2013.01); G03B 2205/0007 (2013.01)

(58) Field of Classification Search
CPC ......... G02B 7/006; G02B 7/022; G02B 7/026
See application file for complete search history.

(56) References Cited

U.S. PATENT DOCUMENTS

2015/0131175 A1*  5/2015  Lamontagne .......... G02B 7/003
                                                                      359/830
2017/0102554 A1*  4/2017  Yagi ...................... G02B 27/646

FOREIGN PATENT DOCUMENTS

JP          6-76944        10/1994

* cited by examiner

*Primary Examiner* — Bumsuk Won
*Assistant Examiner* — Ephrem Mebrahtu
(74) *Attorney, Agent, or Firm* — Wenderoth, Lind & Ponack, L.L.P.

(57) ABSTRACT

A lens barrel includes a filter ring retainer, an OIS base frame, and a ring-shaped filter ring. The filter ring retainer has a male screw. The OIS base frame has a female screw locking the male screw. The ring-shaped filter ring has an inner circumferential projection inserted into between the filter ring retainer and the OIS base frame, and is disposed on the outer circumferential side of the filter ring retainer and the OIS base frame.

8 Claims, 9 Drawing Sheets

FIG. 5A
FIG. 5B
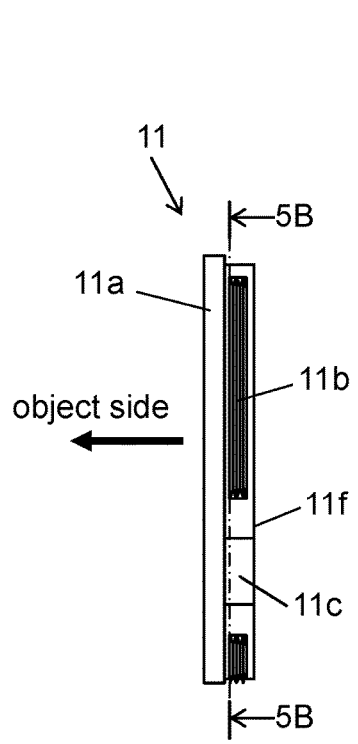
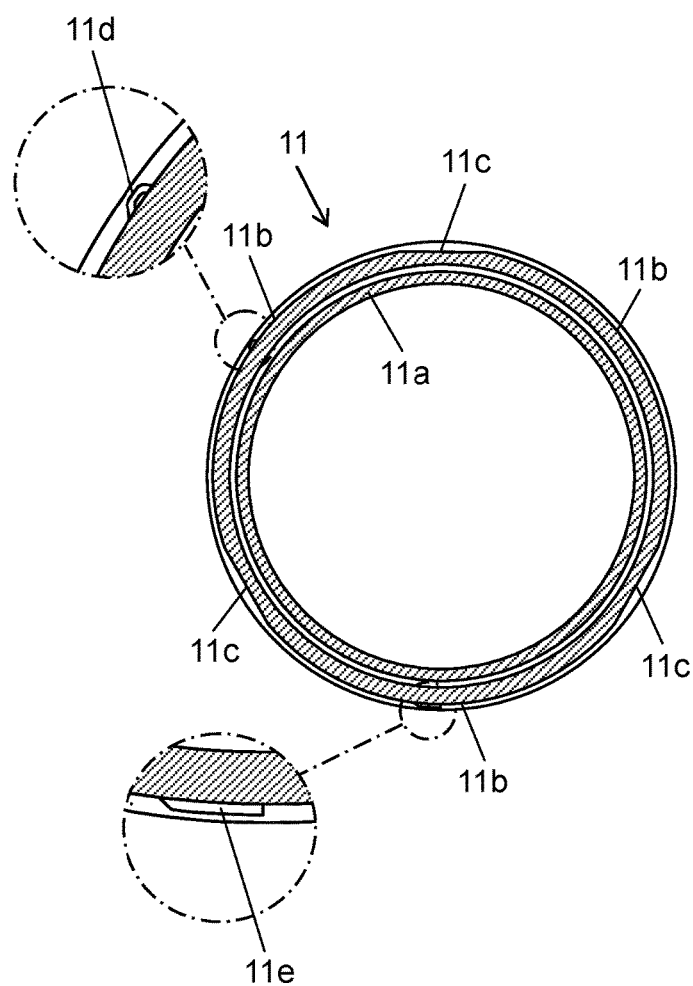

LENS BARREL

BACKGROUND

1. Technical Field

The present disclosure relates to a lens barrel.

2. Description of Related Art

A lens barrel has multiple lens groups disposed along the direction of the optical axis, where these respective lens groups are mounted to respective lens frames.

For example, Japanese Utility Model Unexamined Publication No. 1106-076944 discloses a structure of camera lenses fastened with screws with a rotation ring (a fastened component) disposed into between a base component and an inner ring.

SUMMARY

The present disclosure provides a lens barrel with a smaller radial length.

A lens barrel according to the disclosure includes a ring-shaped component, a base component, and a ring-shaped fastened component. The ring-shaped component has a first locking part. The base component has a second locking part that locks the first locking part. The ring-shaped fastened component has a projection inserted into between the ring-shaped component and the base component, and is disposed on the outer circumferential side of the ring-shaped component and base component.

BRIEF DESCRIPTION OF DRAWINGS

FIG. 5A is a side view of the filter ring retainer of FIG. 4.

FIG. 5B is a cross sectional view viewed from line 5B-5B in FIG. 5A.

DETAILED DESCRIPTION

Hereinafter, a detailed description is made of some exemplary embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure and are not intended to limit the subjects described in the claims.

First Exemplary Embodiment

The following is a description of lens barrel 10 according to an embodiment of the disclosure using FIGS. 1 through 9B.

[Overall Configuration of Lens Barrel 10]

Figure 1:
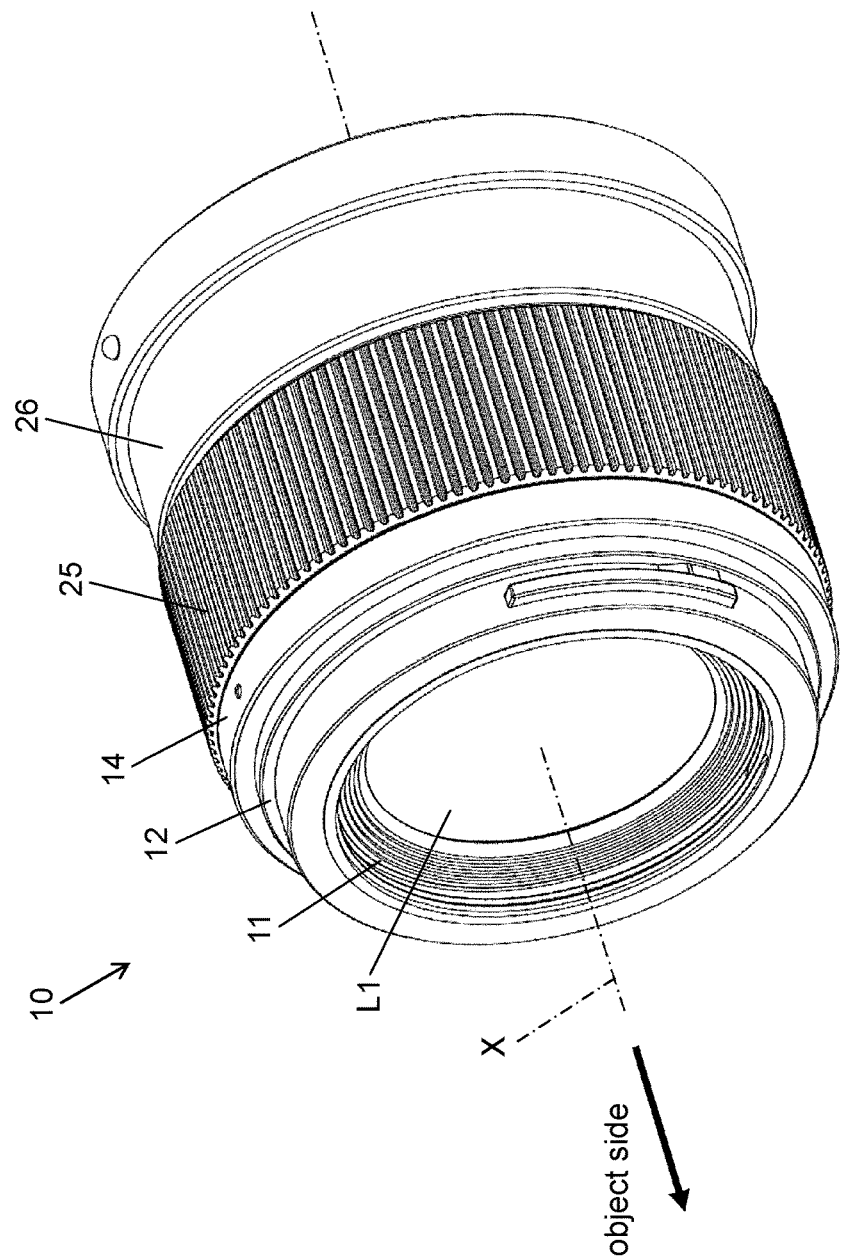
FIG. 1 is an overall perspective view illustrating the configuration of a lens barrel according to an embodiment of the disclosure.

Lens barrel 10 according to the embodiment is a lens unit removable from and attachable to a camera body (unillustrated) as shown in FIG. 1. Lens barrel 10 includes filter ring retainer 11, first lens L1, filter ring 12, front frame 14, focus ring 25, and rear frame 26, in this order from the object side in the direction of optical axis X in external view.

Figure 2:
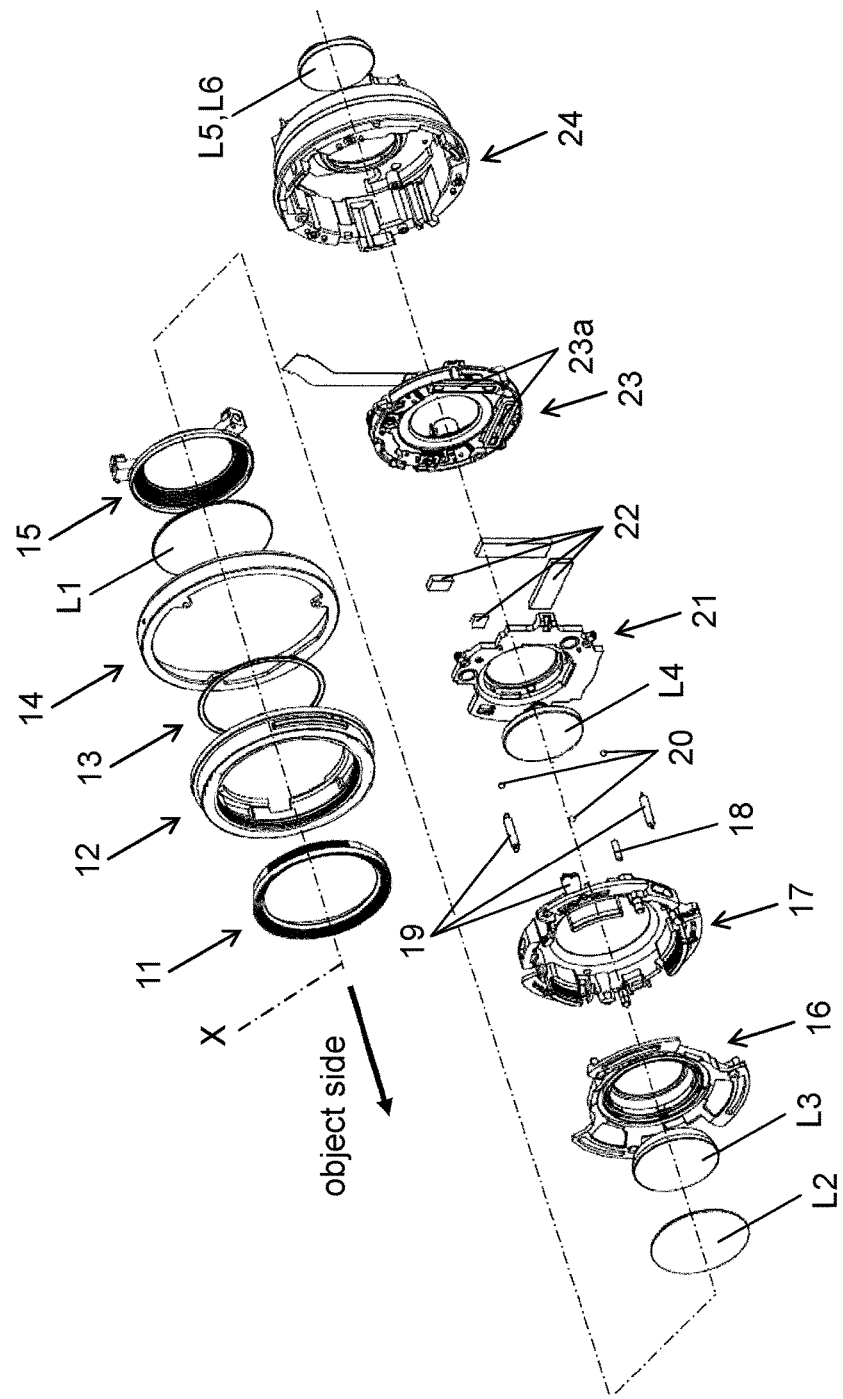
FIG. 2 is an exploded perspective view of respective components constituting the object-side part of the lens barrel of FIG. 1.

Here, of those constituting lens barrel 10, main components constituting the part at the object side in the direction of the optical axis are disposed as shown in FIG. 2.

Specifically, filter ring retainer (ring-shaped component) 11, filter ring (fastened component) 12, dust-prevention ring 13, front frame 14, first lens L1, 1a-group lens frame 15, second lens L2, third lens L3, 1b-group lens frame 16, OIS base frame (base component) 17, OIS rotary shaft 18, OIS spring 19, OIS ball 20, OIS lens frame 21, OIS magnet 22, aperture unit 23, and fastening frame 24 are disposed in this order viewed from the object side in the direction of optical axis X.

FIG. 2 shows only first through sixth lenses L1 through L6 of the 10 lenses contained in lens barrel 10. However, it is assumed that the remaining seventh through tenth lenses are disposed at the back side of sixth lens L6 viewed from the object side in the direction of optical axis X. The OIS described above refers to what is called an optical image stabilizer, which drives the correcting lens (fourth lens L4) in a direction compensating for any shake of the camera body to reduce blurring of an object image.

Figure 3:
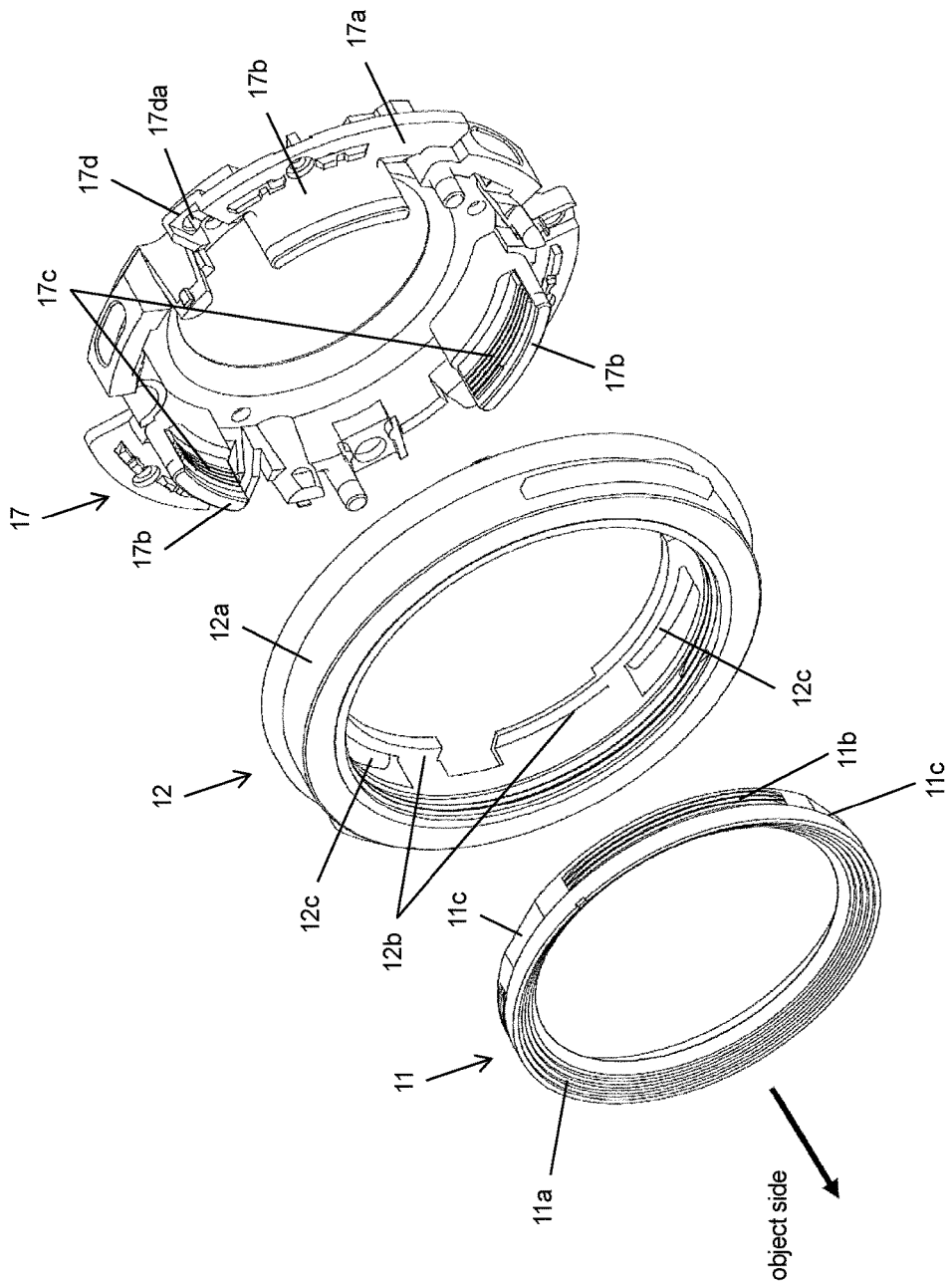
FIG. 3 is an exploded perspective view illustrating the configuration of main components disposed on the object side of the lens barrel of FIG. 1.

As shown in FIG. 2, filter ring retainer (ring-shaped component) 11 is a ring-shaped component disposed closest to the object side in the direction of optical axis X. As shown in FIG. 3, filter ring retainer 11 is disposed so as to insert part of filter ring 12 into between filter ring retainer 11 and OIS base frame 17. Detailed configuration of filter ring retainer 11 is described later.

As shown in FIG. 1, filter ring 12 is a ring-shaped component constituting part of the outer shell of lens barrel 10. Filter ring 12 is configured so that an optical filter can be attached to filter ring 12. As shown in FIG. 2, filter ring 12 is disposed between filter ring retainer 11 and front frame 14 in the direction of optical axis X. Then, filter ring 12 is fastened with the fastening structure (described later) so as to be inserted into between filter ring retainer 11 and OIS base frame 17.

Detailed configuration of filter ring 12 is described later.

Dust-prevention ring 13 is provided between filter ring 12 and 1a-group lens frame 15 to fill a gap formed between exterior components and internal components. This prevents dust ingress from the outside of lens barrel 10.

As shown in FIG. 2, front frame 14 is disposed at the back side of filter ring 12 viewed from the object side in the direction of optical axis X. Front frame 14 is fastened to filter ring 12 with screws from the side opposite to the object side in the direction of optical axis X.

As shown in FIG. 1, front frame 14 is disposed so as to cover the part where filter ring 12 is connected with OIS base frame 17 from the outer circumference.

As shown in FIG. 2, first lens L1 is attached to 1a-group lens frame 15, which is fastened to OIS base frame 17 with the optical axis of first lens L1 being adjustable.

As shown in FIG. 2, second lens L2 and third lens L3 are attached to 1b-group lens frame 16, which is fastened to OIS base frame 17 with the optical axes of second lens L2 and third lens L3 being adjustable, in the same way as 1a-group lens frame 15.

As shown in FIG. 2, OIS base frame 17 is a substantially cylinder-shaped component and retains 1a-group lens frame 15 and 1b-group lens frame 16 with their optical axes being adjustable, on the object-side face in the direction of optical axis X. OIS base frame 17 is disposed at the object side of OIS lens frame 21 in the direction of optical axis X.

Further, as shown in FIG. 3, OIS base frame 17 fastens filter ring 12 disposed at the object side in the direction of optical axis X so as to insert filter ring 12 together with filter ring retainer 11.

Detailed configuration of OIS base frame 17 is described later.

As shown in FIG. 2, OIS rotary shaft 18 is fastened to OIS base frame 17, and is a rotation center of OIS lens frame 21 driven by an actuator in a plane vertical to the direction of optical axis X.

As shown in FIG. 2, three OIS springs 19 are provided between OIS base frame 17 and OIS lens frame 21. OIS spring 19 uses an elastic force to support OIS lens frame 21 on OIS base frame 17 in a state rotatable around OIS rotary shaft 18.

As shown in FIG. 2, three OIS balls 20 are provided between OIS base frame 17 and OIS lens frame 21.

As shown in FIG. 2, fourth lens L4 is attached to OIS lens frame 21, which rotates around OIS rotary shaft 18 while undergoing a driving force by an actuator (coil 23a provided on aperture unit 23) and moves in a plane vertical to the direction of optical axis X to optically correct blurring.

As shown in FIG. 2, OIS magnet 22 is disposed at the back side of OIS lens frame 21.

Aperture unit 23 is an optical component that adjusts the amount of light incoming to an imaging element provided at the side of the camera body (unillustrated). As shown in FIG. 2, aperture unit 23 is provided between the back surface of OIS lens frame 21 on which OIS magnet 22 is attached; and fastening frame 24.

As shown in FIG. 2, fastening frame 24 is a cylinder-shaped component. Fifth lens L5 and sixth lens L6 are attached to fastening frame 24 on its bottom surface opposite to the object side in the direction of optical axis X. Fastening frame 24 contains components such as OIS lens frame 21, OIS magnet 22, and aperture unit 23, at the side of the inner circumferential surface.

Next, a detailed description is made of the configurations of filter ring retainer 11, filter ring 12, and OIS base frame 17, all of which are major components of lens barrel 10 of the embodiment.

[Filter Ring Retainer 11]

Figure 4:
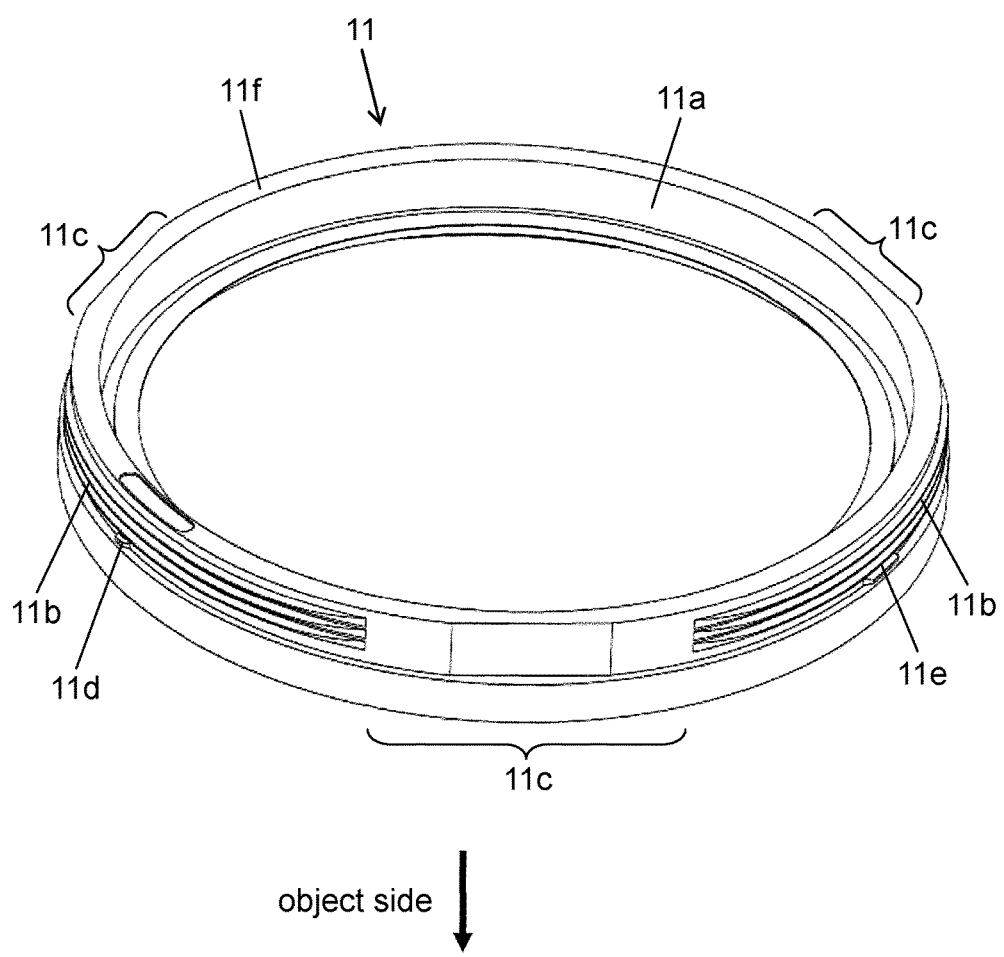
FIG. 4 is a perspective view illustrating the configuration of the filter ring retainer included in the main components of FIG. 3.

As shown in FIGS. 4, 5A, and 5B, filter ring retainer 11 has body 11a, male screw (first locking part) 11b, screw unformed part 11c, projection (first projection) 11d, projection (third projection) 11e, and end face 11f.

As shown in FIG. 4, body 11a is provided with male screw 11b, screw unformed part 11c, projection 11d, and projection 11e, on the outer circumferential surface of a ring-shaped component.

Male screw (first locking part) 11b is a screw groove provided for fastening filter ring retainer 11 to OIS base frame 17 (described later), and as shown in FIG. 4, is formed along the circumferential direction of the outer circumferential surface of body 11a. Male screws 11b are provided at three positions with given intervals in the circumferential direction of the outer circumferential surface of body 11a. Male screw 11b screw-fits female screw 17c formed at the side of the inner circumferential surface of wall 17b of OIS base frame 17 (described later).

As shown in FIG. 4, screw unformed parts 11c are formed between three male screws 11b on the outer circumferential surface of body 11a. Screw unformed part 11c is part of the outer circumferential surface where a screw groove is not formed. When filter ring retainer 11 is fastened to OIS base frame 17, filter ring retainer 11 is inserted with screw unformed part 11c first positioned so as to face female screw 17c at the side of OIS base frame 17.

This allows male screw 11b and female screw 17c to avoid contacting each other in the optical axis direction immediately before they screw-fit. Further, screw unformed part 11c allows male screw 11b and female screw 17c to be easily fastened to each other with a small number of degrees of rotation angle from the state immediately before they screw-fit.

As shown in FIG. 5B, projection (first projection) 11d is formed at one position in the outer circumferential surface of body 11a so as to project radially outward. As shown in FIG. 4, projection 11d is formed adjacent to male screw 11b on the outer circumferential surface of body 11a, at the object side in the direction of optical axis X.

As shown in FIG. 5B, projection (third projection) 11e is formed at one position in the outer circumferential surface of body 11a so as to project radially outward, in the same way as projection 11d. As shown in FIG. 4, projection 11e is formed adjacent to male screw 11b, which is different from male screw 11b with projection 11d adjacently disposed, at the object side in the direction of optical axis X.

Here, for male screw 11b at the side of filter ring retainer 11 to screw-fit female screw 17c (refer to FIG. 7) at the side of OIS base frame 17, filter ring retainer 11 is rotated with respect to OIS base frame 17.

In this case, projection 11d moves to a position that projection 11d has reached immediately after passing over projection (second projection) 17e (refer to FIG. 7) formed adjacent to female screw 17c at the side of OIS base frame 17 (described later). This restrains filter ring retainer 11 from rotating in the reverse direction, which prevents loosening of fastening by filter ring retainer 11. That is, projection 11d functions as a device for locking rotation of filter ring retainer 11.

Further, in a state of filter ring retainer 11 fastened to OIS base frame 17, projection 11e is in contact with projection 17f (refer to FIG. 7) at the side of OIS base frame 17 in a plane vertical to the direction of optical axis X. This prevents filter ring retainer 11 from being screwed into the inner part of OIS base frame 17 beyond a given fastening position in the direction of optical axis X when filter ring retainer 11 is fastened to OIS base frame 17. That is, projection 11e functions as a stopper in the screw-in direction (the direction of optical axis X).

As shown in FIGS. 4 and 5A, end face 11f is a face formed at the side of body 11a, opposite to the object side in the direction of optical axis X. That is, end face 11f is a face formed at the side inserted to OIS base frame 17. End face 11f inserts part (inner circumferential projection 12b) of filter ring 12 between end face 11f and part of OIS base frame 17 to fasten the part of filter ring 12, in the structure of fastening filter ring 12 (described later).

[Filter Ring 12]

As shown in FIG. 3, filter ring (fastened component) 12 is a ring-shaped component fastened between filter ring retainer 11 and OIS base frame 17 without using screws, for example. Filter ring 12 has body 12a, inner circumferential projection 12b, and opening 12c.

Figure 6A:
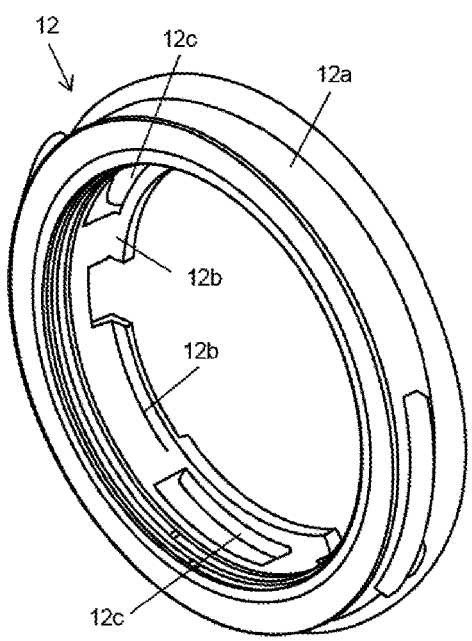
FIG. 6A is a perspective view illustrating the configuration of the filter ring included in the main components of FIG. 3.
Figure 6B:
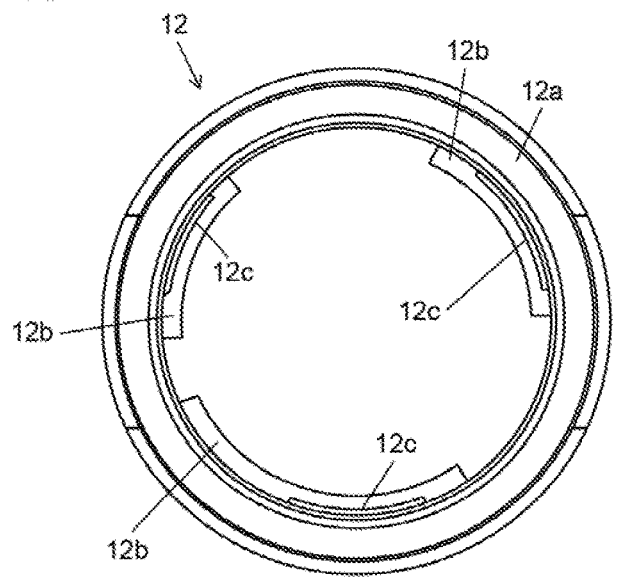
FIG. 6B is a plan view illustrating the configuration of the filter ring included in the main components of FIG. 3.

As shown in FIGS. 6A and 6B, body 12a is a ring-shaped component, and inner circumferential projection 12b and opening 12c are provided at the side of the inner circumferential surface of body 12a.

Inner circumferential projections 12b are separately formed at three positions so as to project radially inwardly from the end opposite to the object side in the direction of optical axis X in the inner circumferential surface of body 12a. Then, in each base of three inner circumferential projections 12b joined to the inner circumferential surface of body 12a, opening 12c is formed piercing in the direction of optical axis X.

As shown in FIGS. 6A and 6B, respective openings 12c are formed along the circumferential direction in three respective inner circumferential projections 12b. Openings 12c are formed with their circumferential lengths different from one another. Respective walls 17b of OIS base frame 17 (described later) are inserted into respective openings 12c.

The openings 12c allow the walls 17b to be exposed toward the inner circumferential surface of body 12a. Hence, filter ring retainer 11 can be fastened to OIS base frame 17 by screw-fitting male screw (first locking part) 11b of filter ring retainer 11, which is inserted toward the inner circumference of filter ring 12, with female screw (second locking part) 17c exposed toward the inner circumferential surface.

This allows filter ring 12 disposed between filter ring retainers 11 fastened to each other; and OIS base frame 17 to be fastened without using screws, for example.

A detailed description is made later of this structure of fastening filter ring 12.

[OIS Base Frame 17]

Figure 7:
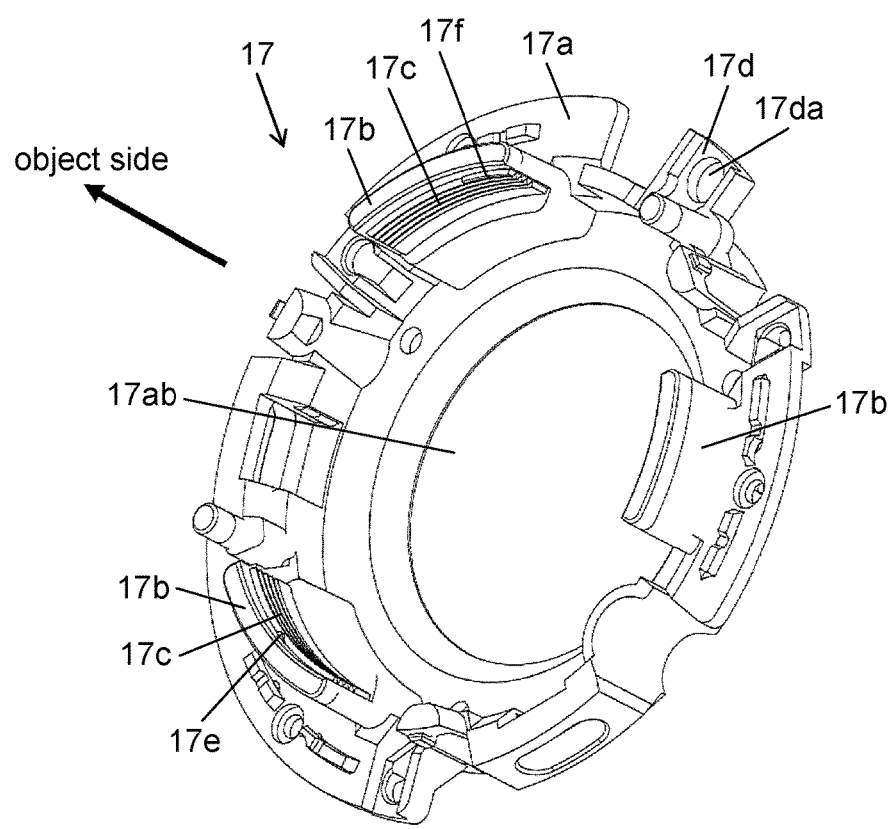
FIG. 7 is a perspective view illustrating the configuration of the OIS base frame included in the main components of FIG. 3.

As shown in FIGS. 3 and 7, OIS base frame (base component) 17 is a substantially cylinder-shaped component and has body 17a, walls 17b, female screws 17c, rests 17d, projections 17e, and projections 17f.

Body 17a has circular opening 17ab formed in the central part of the disk shape.

As shown in FIG. 7, wall 17b is provided upright from the part near the outer circumference of disk-shaped body 17a toward the object side in the direction of optical axis X. Walls 17b are provided at three positions in the circumferential direction. Further, walls 17b are formed with their circumferential lengths different from one another.

As shown in FIG. 7, female screws (second locking parts) 17c, which are screw grooves formed in the inner circumferential surface of wall 17b, are provided at three positions with given intervals along the circumferential direction of body 17a. Then, female screws 17c screw-fit male screws 11b formed on the outer circumferential surface of filter ring retainer 11 described above.

Here, wall 17b is inserted into opening 12c formed in the base of inner circumferential projection 12b of filter ring 12 described above. At this moment, female screw 17c formed in the inner circumferential surface of wall 17b is in a state exposed toward the inner circumferential surface of filter ring 12.

Three walls 17b are formed with their circumferential lengths different from one another. The respective circumferential lengths are determined according to the circumferential lengths of openings 12c provided at the side of filter ring 12 described above.

This allows circumferential positioning when filter ring 12 is attached to OIS base frame 17.

As shown in FIG. 7, rest 17d is formed so as to project from the outermost circumference of body 17a radially outward. Part of 1a-group lens frame 15 described above is rested on rest 17d.

Figure 8A:
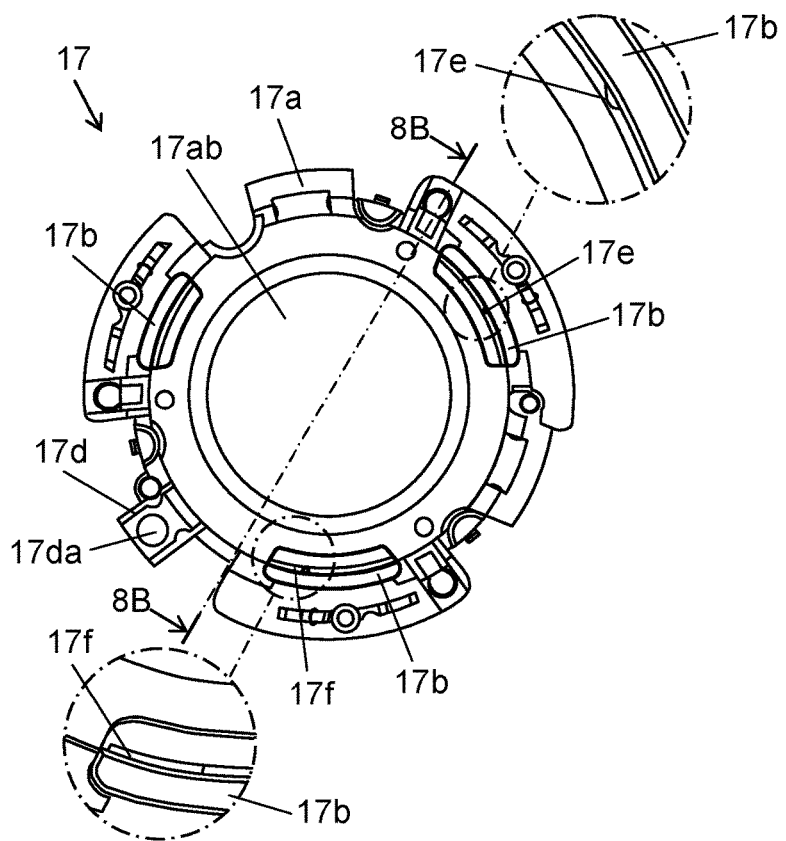
FIG. 8A is a plan view of the OIS base frame of FIG. 7.
Figure 8B:
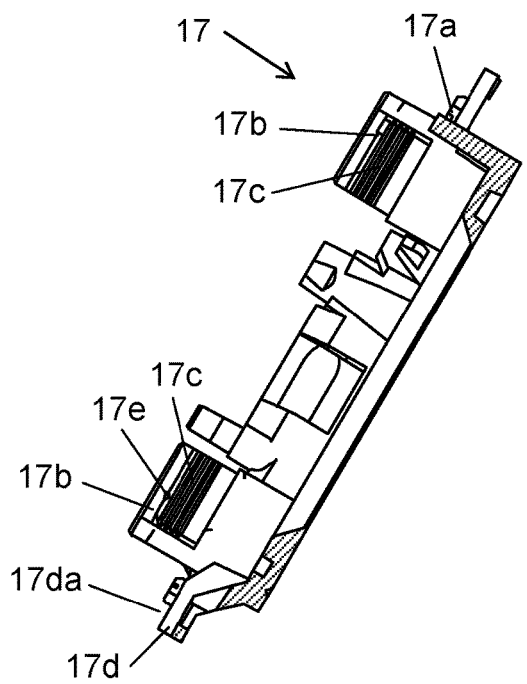
FIG. 8B is a cross sectional view viewed from line 8B-8B in FIG. 8A.

As shown in FIGS. 7, 8A, and 8B, hole 17da is a through-hole formed in the surface of rest 17d vertical to optical axis X. Into hole 17da, a pin is inserted for fastening part of 1a-group lens frame 15 rested on rest 17d to fastening frame 24.

As shown in FIGS. 7 and 8A, projection (second projection) 17e is formed adjacent to the object side of female screw 17c in the direction of optical axis X, formed in the inner circumferential surface of one wall 17b of three walls 17b. Projection 17e is formed so as to project from the inner circumferential surface of wall 17b, radially inward.

As shown in FIGS. 7 and 8B, projection (fourth projection) 17f is formed adjacent to the object side of female screw 17c in the direction of optical axis X formed in the inner circumferential surface of one wall 17b of three walls 17b. Projection 17f is formed on the inner circumferential surface of wall 17b different from wall 17b on which projection 17e is formed. Projection 17f is formed so as to project from the inner circumferential surface of wall 17b, radially inward, in the same way as projection 17e.

For the case of male screw 11b at the side of filter ring retainer 11 screw-fitting female screw 17c at the side of OIS base frame 17 for fastening, the locking function in the rotation direction by projection 11d and projection 17e is as described above.

Further, the stopper function in the screw-in direction (the direction of optical axis X) by projection 11e in contact with projection 17f is as described above.

[Structure of Fastening Filter Ring 12]

With lens barrel 10 of the embodiment, filter ring 12 is fastened to OIS base frame 17 without using screw, for example, as shown in FIG. 3.

Although FIG. 3 shows no component disposed between filter ring 12 and OIS base frame 17, actually, as shown in FIG. 2, 1a-group lens frame 15, 1b-group lens frame 16, and other components are disposed in between. Here, for convenience of description, components other than filter ring retainer 11, filter ring 12, and OIS base frame 17 are omitted in the description.

Figure 9A:
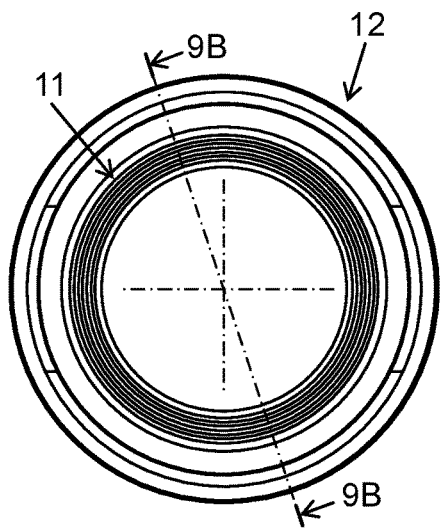
FIG. 9A is a view of the configuration of the main components in FIG. 3 assembled together viewed from the object side.

With lens barrel 10, as shown in FIG. 9A, filter ring 12 is fastened so as to be inserted into between filter ring retainer 11 and OIS base frame 17 in a state where filter ring 12 and filter ring retainer 11 are incorporated to OIS base frame 17.

Figure 9B:
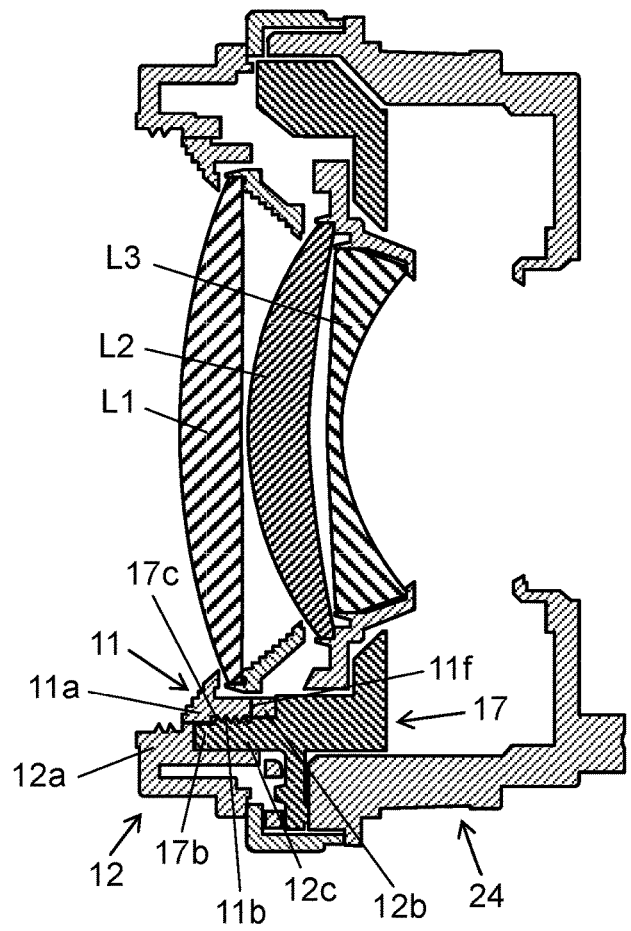
FIG. 9B is a cross sectional view viewed from line 9B-9B in FIG. 9A.

Specifically, as shown in FIG. 9B, in a state where these components are incorporated, wall 17b of OIS base frame 17 is inserted into opening 12c formed in inner circumferential projection 12b provided on the inner circumferential surface of filter ring 12.

At this moment, male screw 11b of filter ring retainer 11 inserted from the object side in the direction of optical axis X screw-fits female screw 17c formed in the inner circumferential surface of wall 17b, to be fastened.

In this fastened state, as shown in FIG. 9B, end face 11*f* of filter ring retainer 11 is disposed so as to insert part of inner circumferential projection 12*b* of filter ring 12 between end face 11*f* and the surface of OIS base frame 17 vertical to the direction of optical axis X.

This restrains movement of filter ring 12 in the direction of optical axis X, which allows filter ring 12 to be fastened to OIS base frame 17 without using screw, for example. This eliminates the need for a space for screw holes for example in both filter ring 12 and OIS base frame 17, resulting in a shorter radial length of lens barrel 10 than the existing ones.

Other Embodiments

Hereinbefore, the description is made of one embodiment of the disclosure; the disclosure is not limited to the above-described embodiment, but various types of modifications may be added within a scope that does not deviate from the gist of the present disclosure.

(A)

In the above-described embodiment, the description is made of an example where male screw 11*b* and female screw 17*c* are used as first and second locking parts, respectively, for fastening filter ring retainer 11 to OIS base frame 17. However, the disclosure is not limited to the example.

For example, instead of using screws, a structure may be used in which, using elastic deformation of a resin-made component, the resin-made component is inserted while being elastically deformed and is locked at a given fastening position.

(B)

In the above-described embodiment, the description is made of an example where openings 12*c* at the side of filter ring 12 are provided at three positions at given intervals in the circumferential direction, and so are walls 17*b* at the side of OIS base frame 17; however, the disclosure is not limited to the example.

For example, above-described opening 12*c* and wall 17*b* are provided at one position each in the circumferential direction. Alternatively, they may be provided at two positions, or four or more positions.

Even in such cases, positioning can be performed of the filter ring relative to the OIS base frame in the radial and circumferential directions.

(C)

In the above-described embodiment, the description is made of an example where opening 12*c* is provided at the side of filter ring 12 in order for wall 17*b* at the side of OIS base frame 17 to be inserted to expose female screw 17*c* formed in the inner circumferential surface of wall 17*b* to the side of the inner circumferential surface of filter ring 12; however, the disclosure is not limited to the example.

For example, a cut-away part may be provided instead of an opening.

That is, the shape is not limited to an opening as long as female screw 17*c* can be exposed to the inner circumferential surface of filter ring 12.

(D)

In the above-described embodiment, the description is made of an example where filter ring 12 is used for a component fastened to the side of the base component without using a screw; however, the disclosure is not limited to the example.

For example, the structure according to the disclosure may be applied to other components contained in the lens barrel.

(E)

In the above-described embodiment, the description is made of an example where projections 17*e* and 17*f* having locking and stopper functions for filter ring retainer 11 are provided on different walls 17*b* of OIS base frame 17; however, the disclosure is not limited to the example.

For example, two projections having locking and stopper functions may be provided on the same wall.

In this case, as a result that the respective walls are provided with two projections, and the screws are disposed at an equally divided phase of 120 degrees, a filter ring retainer can be attached in the same way as the above-described embodiment.

(F)

In the above-described embodiment, the description is made of an example where three male screws 11*b* are formed roughly at regular intervals in the circumferential direction on the outer circumferential surface of filter ring retainer 11; however, the disclosure is not limited to the example.

For example, male screws formed on the filter ring retainer may be formed on the entire circumference of the outer circumferential surface.

In this case, filter ring retainers 11 can be assembled at multiple positions by providing respective walls 17*b* with projections and screws, equally shaping walls 17*b*. and evenly disposing walls 17*b* in the circumferential direction. For example, if walls 17*b* are disposed at positions equally divided into three parts in the circumferential direction, filter ring retainers 11 can be assembled at every 120-degree position.

(G)

In the above-described embodiment, the description is made of an example where three female screws 17*c* are formed roughly at regular intervals in the circumferential direction in the inner circumference of OIS base frame 17; however, the disclosure is not limited to the example.

For example, female screws formed in OIS base frame 17 may be formed in the entire circumference of the inner circumferential surface of one wall continuous in the circumferential direction.

Alternatively, female screws formed in OIS base frame 17 may be formed at given intervals in the circumferential direction in the inner circumferential surface of one wall continuous in the circumferential direction.

(H)

In the above-described embodiment, the description is made of an example where projections 11*e* and 17*f* are used that function as a stopper in the screw-in direction of filter ring retainer 11; however, the disclosure is not limited to the example.

For example, a structure may also be applicable in which, using elastic deformation of a resin-made component described in embodiment (A), the resin-made component is inserted while being elastically deformed and is locked at a given fastening position.

(I)

In the above-described embodiment, the description is made of an example where filter ring retainer 11 that fastens filter ring 12 to OIS base frame 17 is fastened with screws; however, the disclosure is not limited to the example.

For example, a wall formed along the circumferential direction may be used instead of screws.

What is claimed is:

1. A lens barrel comprising:
 a ring-shaped component having at least one first locking part;

a base component having at least one second locking part locking the at least one first locking part; and a ring-shaped fastened component having a projection projecting radially inwardly, the fastened component being disposed between the ring-shaped component and the base component, the fastened component being disposed on an outer circumferential side of the ring-shaped component and the base component, wherein the projection of the fastened component has an opening, the at least one second locking part of the base component extending through the opening in a direction of an optical axis of the lens barrel and engaging the at least one first locking part of the ring-shaped component.

2. The lens barrel of claim 1, wherein the base component has a wall extending in the direction of the optical axis of the lens barrel, the wall extending through the opening for exposing a radially outer surface of the wall of the base component to an inner circumference of the fastened component, the at least one second locking part being formed on a radially inner surface of the wall.

3. The lens barrel of claim 1, wherein the at least one first locking part comprises a plurality of first locking parts, and the plurality of first locking parts are arranged in a circumferential direction of the ring-shaped component at given intervals on an outer circumferential surface of the ring-shaped component.

4. The lens barrel of claim 1, wherein the at least one second locking part comprises a plurality of second locking parts, and the plurality of second locking parts are arranged in a circumferential direction of the base component at given intervals on an inner circumferential surface of the base component.

5. The lens barrel of claim 1, wherein the at least one first locking part and the at least one second locking part are a combination of a male screw and a female screw.

6. The lens barrel of claim 5, wherein the ring-shaped component has a first projection at a screw part at which the at least one first locking part screw-fits the at least one second locking part, wherein the base component has a second projection at a screw part at which the at least one second locking part screw-fits the at least one first locking part, and wherein, in a state in which the ring-shaped component is locked to the base component, the first projection engages the second projection to restrict rotation of the ring-shaped component with respect to the base component.

7. The lens barrel of claim 5, wherein the ring-shaped component has a third projection at a screw part at which the at least one first locking part screw-fits the at least one second locking part, wherein the base component has a fourth projection at a screw part at which the at least one second locking part screw-fits the at least one first locking part, and wherein, in a state in which the ring-shaped component is locked to the base component, the third projection engages the fourth projection to restrict movement of the ring-shaped component in an optical axis direction with respect to the base component.

8. The lens barrel of claim 1, wherein the fastened component is a filter ring to which an optical filter is attached.

* * * * *